US007591430B2

(12) United States Patent
Talach et al.

(10) Patent No.: US 7,591,430 B2
(45) Date of Patent: Sep. 22, 2009

(54) POINT-OF-SALE TERMINAL

(75) Inventors: David Talach, Roseville, CA (US); Mehran Mirkazemi, Roseville, CA (US)

(73) Assignee: VeriFone Holdings, Inc., San Jose, CA (US)

( * ) Notice: Subject to any disclaimer, the term of this patent is extended or adjusted under 35 U.S.C. 154(b) by 0 days.

(21) Appl. No.: 11/600,309

(22) Filed: Nov. 14, 2006

(65) Prior Publication Data

US 2007/0190867 A1 Aug. 16, 2007

Related U.S. Application Data

(60) Provisional application No. 60/737,078, filed on Nov. 15, 2005.

(51) Int. Cl.
*G06K 7/10* (2006.01)

(52) U.S. Cl. .................. 235/472.01; 347/109; 347/222; 347/171; 235/383; 235/380; 156/577; 156/361; 400/693; 400/88; 400/611; 400/613

(58) Field of Classification Search ............. 235/472.01
See application file for complete search history.

(56) References Cited

U.S. PATENT DOCUMENTS 4,264,396 A * 4/1981 Stewart ...................... 156/361
4,826,558 A * 5/1989 Wada et al. ................. 156/384
5,786,983 A * 7/1998 Brenner et al. .............. 361/680
6,991,159 B2 * 1/2006 Zenou ........................ 235/383
2002/0181992 A1 * 12/2002 Taylor ........................ 400/611
2005/0002715 A1 * 1/2005 Fries et al. .................... 400/88

OTHER PUBLICATIONS

Dione Xplorer brochure, by Dione PLC of the United Kingdom, 2004.

Xplorer Terminal User Guide, by Dione PLC of the United Kingdom, 2004.

* cited by examiner

*Primary Examiner*—Daniel Walsh
*Assistant Examiner*—Tae W Kim
(74) *Attorney, Agent, or Firm*—Kolisch Hartwell, PC

(57) ABSTRACT

A point of sale terminal that is capable of printing on a roll of paper is provided with a compartment defining an upper surface and an opposite lower surface, a left side and a right side between the upper and lower surfaces, and a rear surface between the upper and lower surfaces. The terminal also includes a display and a keypad disposed on the upper surface, and a printer with a paper roller and a printing mechanism for receiving and printing on the roll of paper. The printer is disposed within the compartment, and a door is provided in the lower surface of the compartment for insertion of the roll of paper. The compartment is provided with an exit for the paper adjacent the rear surface.

13 Claims, 2 Drawing Sheets

POINT-OF-SALE TERMINAL

This application claims priority under 35 U.S.C. 119(e) to U.S. Provisional Patent Application No. 60/737,078 entitled "POINT-OF-SALE TERMINAL," filed Nov. 15, 2005, the disclosure of which is incorporated herein by reference.

BACKGROUND

Point-of-sale (POS) terminals allow customers to pay for purchases using a wide variety of payment methods, such as with credit cards, debit cards, and gift cards and other prepaid cards, among others. Typically a terminal includes a card reader, a keypad, a display, additional reprogrammable keys surrounding the display, a printer, and a communication capability, e.g., a serial port, a parallel port, Ethernet, or a wireless transceiver. The communication capability links the terminal to a POS system, such as a PC-based cash register, in a retail establishment so that a customer can use a card to pay for goods or services provided in the establishment. The POS system typically processes the payment by communication with the terminal and with a payment processor.

A terminal provided with a wireless communication capability, and made sufficiently small and ergonomic to be handheld, can be carried by an employee of the retail establishment so that payments can be made at a location convenient for the customer. Such a portable terminal may be sized and shaped to fit in a waist-carried holster or to be hand-carried by the employee. The terminal may have an upper surface where the keypad, display, and reprogrammable keys are located. These keys and display can be more ergonomic in terms of ease of use and viewing, while maintaining a sufficiently small size and shape for portability, if other features of the terminal, such as the printer, use a lower, side, or rear surface, rather than the upper surface.

DETAILED DESCRIPTION

Figure 1:
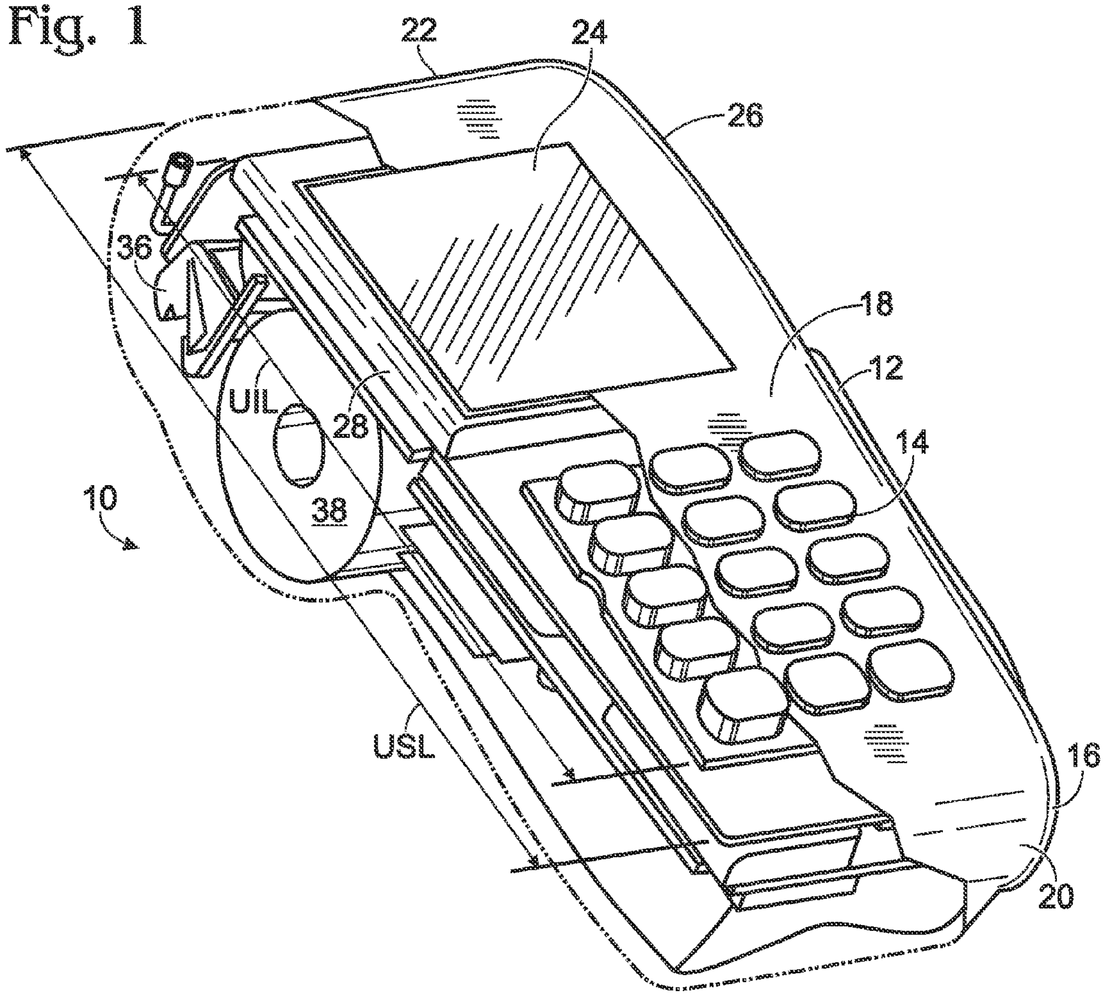
FIG. 1 is an isometric view of a terminal in accordance with an embodiment of the invention, with an external compartment shown as partially transparent and internal paper roller and printing mechanism shown within the compartment and external display and keypad on an upper surface of the compartment.
Figure 2:
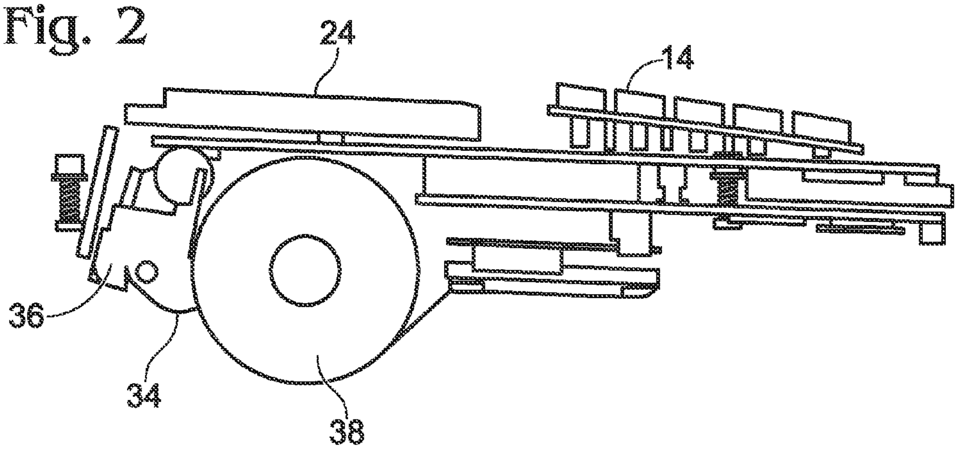
FIG. 2 is a side view of the components of the terminal with the compartment removed, showing the display, keypad, and a paper roll.
Figure 3:
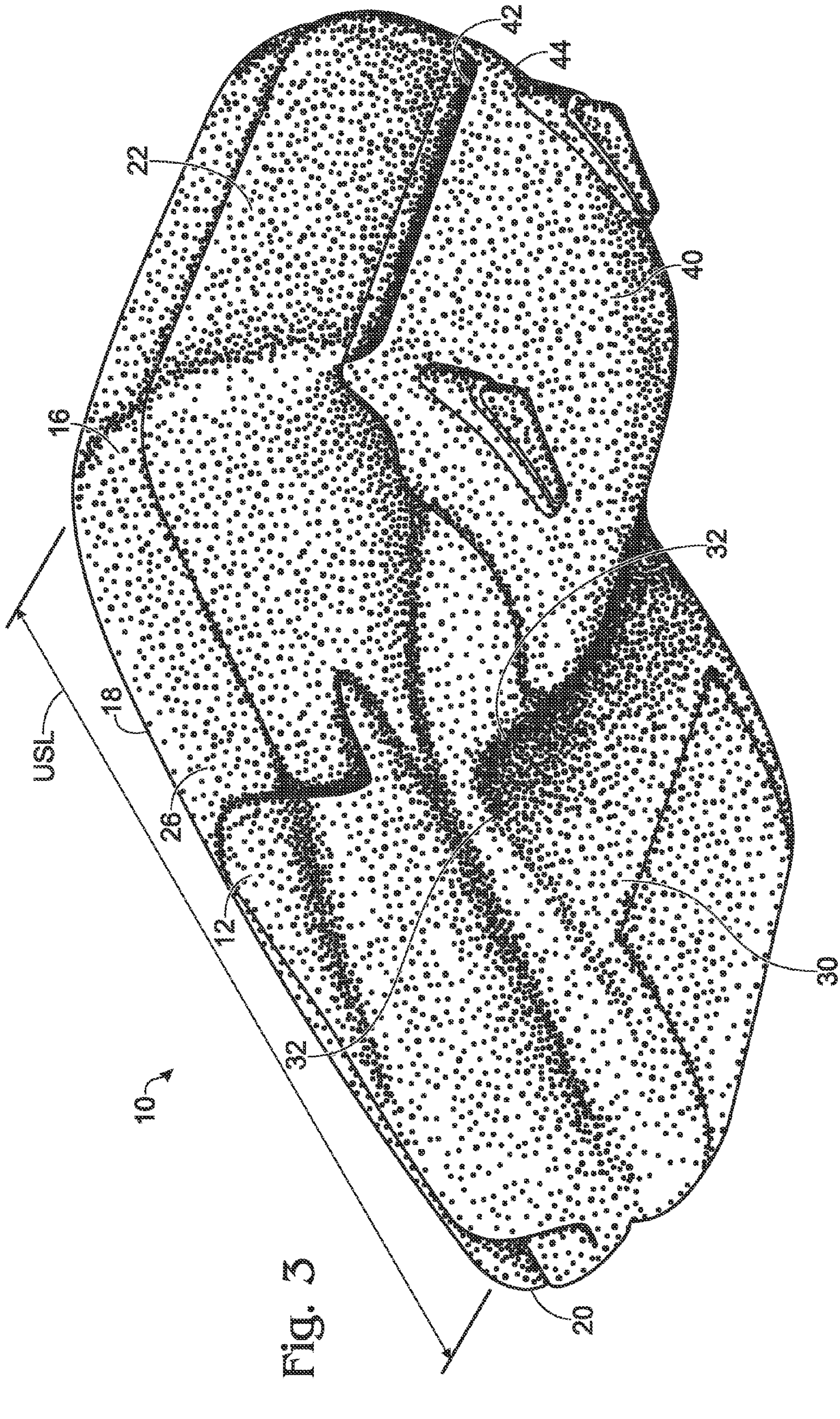
FIG. 3 is an isometric view of the terminal of FIG. 1 from an opposite angle showing a printer door on a lower surface of the compartment, a paper exit adjacent the door and a rear surface of the compartment, and a magnetic stripe reader on a right side of the compartment.

A POS terminal in accordance with an embodiment of the present disclosure is indicated generally at 10 in FIGS. 1-3. Terminal 10 may be provided with an 802.11g Wi-Fi wireless communication capability and additionally or alternatively may be provided with any suitable communication capability, such as a serial port, a parallel port, Ethernet, or others. Preferably the terminal provides WPA-level encryption and WPA-PSK (pre-shared keys) for Wi-Fi security and/or comparable security for other communication modes.

Terminal 10 may be sized and shaped to be handheld, permitting the terminal to be handed over to a customer of a retail establishment. Alternatively the terminal may be used on a countertop. Terminal 10 may include any type of card reader, such as a magnetic stripe reader 12, and additionally or alternatively a smart card reader using electrical terminals or RF communication. A keypad 14 may also be used to enter card and/or PIN information.

Terminal 10 may be made with a rugged compartment 16 to handle a retail operating environment that may involve impacts from dropping or other rough handling of the terminal and spills or other sources of liquids. Magnetic stripe reader 12 may include a moisture seal or restriction to prevent liquids from getting inside the terminal, as described in a non-provisional application (which is incorporated herein by reference for all purposes) filed by the owner of this application on the same day as this application.

Compartment 16 defines an upper surface 18 extending roughly from a front side 20 to a rear surface 22. A display 24 and keypad 14 are typically disposed on upper surface 18. A right side 26 and a left side 28 extend from front side 20 to rear surface 22 on opposite sides of compartment 16. A lower surface 30 is opposite the upper surface 18, and compartment 16 defines a distance between the upper and lower surfaces. Lower surface 30 may be provided with a curved shape with a narrow middle section 32 to aid in holding terminal 10 by hand, in which case the distance between the upper and lower surfaces varies and a particular distance can be identified at any point between rear surface 22 and front side 20. Preferably, the weight of the terminal is distributed in a manner for balanced holding of the terminal at or adjacent the middle section.

The terminal includes a microprocessor and other electronics for carrying out typical POS functions and for controlling the display and receiving input from the magnetic stripe reader. For example, a 32-bit ARM9 processor may be used. Preferably, the microprocessor is designed and programmed with a secure architecture to prevent loading and operation of any unauthorized programs. A battery is provided to power the electronics, for example, a lithium ion battery.

Display 24 may include one or more keys disposed around the display, which preferably are reprogrammable by the microprocessor to carry out any of various functions, and typically the display will indicate the function adjacent the reprogrammable key. Display 24 may also be a touch-screen panel with keys integrated into the display. Such keys may be programmed to provide an ATM-style user interface using keys that are either on the display or alongside it, or both. Preferably display 24 is a high-contrast, white backlit display, preferably including a large viewing area, e.g., at least about 128×128 pixels.

Upper surface 18 defines a length USL from front side 20 to rear surface 22 in a direction parallel to the left and right sides. Typically upper surface length USL is about 160 mm, but may be greater or lesser depending on various factors including the target application for the terminal. Display 24 and keypad 14 define a user interface length UIL parallel to the right and left sides from the front-most portion of the keypad to the rearmost portion of the display. Preferably user interface length UIL is about 130 mm, but may be greater or lesser. Preferably, the ratio of user interface length UIL to upper surface length USL is at least about 75% and more preferably is at least about 82%.

Terminal 10 may include within compartment 16 a printer 34 that includes a printing mechanism 36, e.g., a high-speed thermal print head, and a paper roller for mounting a paper roll 38. A printer door 40 is preferably provided in lower surface 30 to allow drop-in, clam-shell loading of paper roll 38. Preferably the terminal can accommodate a paper roll of at least about 40 mm diameter, although other sizes may be used depending on the application. As will be understood, the paper roll defines an initial diameter, e.g., the aforementioned 40 mm, before the paper is used for printing, and the size of the paper roll diminishes as the paper is used for printing receipts. Terminal 10 preferably includes a rear paper exit 42 that may be located at a rear end 44 of printer door 40 adjacent rear surface 22. Paper exit 42 is preferably provided with a dual-tear bar so a printed receipt that has exited the terminal can be torn off either upwardly or downwardly.

As shown in FIGS. 1 and 2, paper roll 38 and printing mechanism 36 are preferably disposed beneath display 24. Printing mechanism 36 preferably is disposed in a rearward location in the compartment. Printing mechanism 36 is preferably closer than the paper roll to the rear surface. Paper roll 38 and printing mechanism 36 are preferably disposed alongside one another at roughly equivalent positions relative to the upper and lower surfaces, as opposed to being stacked, one on top of the other. Display 24, as shown in FIGS. 1 and 2, may be mounted over paper roll 38, in which case display 24 defines a distance from upper surface 8 down to the roll of paper. In this embodiment, compartment 16 defines a distance between upper surface 18 and lower surface 30, at the center of paper roll 38, that is substantially equal to the depth of display 24 plus the initial diameter of the roll of paper. Such distance between upper surface 18 and lower surface 30 at the center of paper roll 38 may be, as shown in FIGS. 1 and 2, a maximum distance for the compartment between the upper and lower surfaces as compared to any other point.

Terminal 10 may be provided with a base station (not shown) that includes a charger for recharging the battery in the terminal. The base station may also include a spare battery for installation in the terminal in case the original battery fails. Terminal 10 may also include one or more USB ports and dial-up modem modules for uploading and downloading programs and information from the terminal.

This disclosure may include one or more independent or interdependent inventions directed to various combinations of features, functions, elements and/or properties. While examples of apparatus and methods are particularly shown and described, many variations may be made therein. Various combinations and sub-combinations of features, functions, elements and/or properties may be claimed in one or more related applications. Such variations, whether they are directed to different combinations or directed to the same combinations, whether different, broader, narrower or equal in scope, are regarded as included within the subject matter of the present disclosure.

The described examples are illustrative and directed to specific examples of apparatus and/or methods rather than a specific invention, and no single feature or element, or combination thereof, is essential to all possible combinations. Thus, any one of various inventions that may be claimed based on the disclosed example or examples does not necessarily encompass all or any particular features, characteristics or combinations, unless subsequently specifically claimed. Where "a" or "a first" element or the equivalent thereof is recited, such usage includes one or more such elements, neither requiring nor excluding two or more such elements. Further, ordinal indicators, such as first, second or third, for identified elements are used to distinguish between the elements, and do not indicate a required or limited number of such elements, and do not indicate a particular position or order of such elements unless otherwise specifically indicated.

The invention claimed is:

1. A point of sale terminal capable of printing on a roll of paper, the roll defining an initial diameter before the paper is used for printing, the terminal comprising:

a compartment defining an upper surface and an opposite lower surface, a door provided in the lower surface allowing access through the lower surface, and a left side and a right side between the upper and lower surfaces, and a rear surface positioned between the upper surface and the door in the lower surface, the door including a rear end adjacent the rear surface;

a display disposed on the upper surface, the display mounted over a location for the roll of paper and defining a depth from the upper surface down to the roll of paper;

a keypad disposed on the upper surface;

a printer including a paper roller and a printing mechanism for receiving and printing on the roll of paper, wherein the printer is disposed within the compartment, the compartment defining a distance between the upper surface and the lower surface at the center of the roll of paper substantially equal to the depth of the display plus the initial diameter of the roll of paper, and further wherein the door allowing access through the lower surface of the compartment is configured for insertion of the roll of paper through the lower surface, and further wherein the compartment is provided with an exit for the paper through the lower surface between the rear end of the door and the rear surface, and wherein the printing mechanism is located in a rearward direction from the paper roller, the printing mechanism disposed between the paper roller and the exit for the paper.

2. The terminal of claim 1, further wherein the printing mechanism is disposed substantially beneath the display.

3. The terminal of claim 1, further wherein the distance between the upper surface and the lower surface of the compartment at the roll of paper is a maximum distance for the compartment between the upper and lower surfaces.

4. The terminal of claim 1, further wherein the paper roller and the printing mechanism are disposed alongside one another at roughly equivalent positions relative to the upper and lower surfaces.

5. The terminal of claim 1, wherein the upper surface defines an upper surface length parallel to the left and right sides, and further wherein the display and the keypad define together a user interface length parallel to the left and right sides, and further wherein the ratio of the user interface length to the upper surface length is at least about 75%.

6. The terminal of claim 5, further wherein the ratio of the user interface length to the upper surface length is at least about 82%.

7. The terminal of claim 1, further comprising a magnetic card reader disposed on one of the right and left sides of the compartment.

8. The terminal of claim 1, wherein the terminal includes a wireless communication capability.

9. The terminal of claim 1, further wherein the compartment is sized and shaped to be hand-carried.

10. The terminal of claim 1, wherein the upper surface length is no more than about 160 mm.

11. The terminal of claim 1, wherein the user interface length is at least about 130 mm.

12. The terminal of claim 1, wherein the compartment is sized to receive a paper roll of at least about 40 mm diameter.

13. The terminal of claim 1 wherein the paper exit includes a dual-tear bar.

* * * * *